United States Patent [19]

Pietzsch et al.

[11] Patent Number: 4,616,723

[45] Date of Patent: Oct. 14, 1986

[54] WHEEL LOAD INDICATOR

[75] Inventors: Ludwig Pietzsch, Karlsruhe; Knud Overlach, Ettlingen; Siegfried Gassner, Pfinztal, all of Fed. Rep. of Germany

[73] Assignee: Ing Ludwig Pietzsch GmbH & Co., Ettlingen, Fed. Rep. of Germany

[21] Appl. No.: 746,294

[22] Filed: Jun. 19, 1985

[30] Foreign Application Priority Data

May 15, 1985 [EP] European Pat. Off. ........ 85106025.1

[51] Int. Cl.⁴ ................... G01G 3/14; G01G 19/02; G01G 19/52
[52] U.S. Cl. ................................. 177/211; 177/132; 177/134
[58] Field of Search ............... 177/126, 132, 133, 134, 177/209, 211

[56] References Cited

U.S. PATENT DOCUMENTS

| 3,365,689 | 1/1968 | Kutsay | 177/211 X |
| 3,381,767 | 5/1968 | Rairigh | 177/126 |
| 3,474,875 | 10/1969 | Laimins | 177/134 |
| 3,949,822 | 4/1976 | English et al. | 177/126 |
| 4,261,429 | 4/1981 | Lockery | 177/211 |
| 4,506,746 | 3/1985 | Lockery | 177/211 |

Primary Examiner—E. A. Goldberg
Assistant Examiner—Patrick W. Foster
Attorney, Agent, or Firm—L. Lawton Rogers, III; Joseph M. Killeen

[57] ABSTRACT

A wheel load indicator comprises a rectangular flat plate (1) of a light material having measuring properties. A series of recesses (4) forming webs (5) are provided along two lateral edges (6) of the plate (1). Strain gauges (12) are adhesively bonded to walls of bores (10) in the area of the webs (5) to determine the shearing stress under the load of a wheel (100) which has driven on the bending portion (3).

25 Claims, 7 Drawing Figures

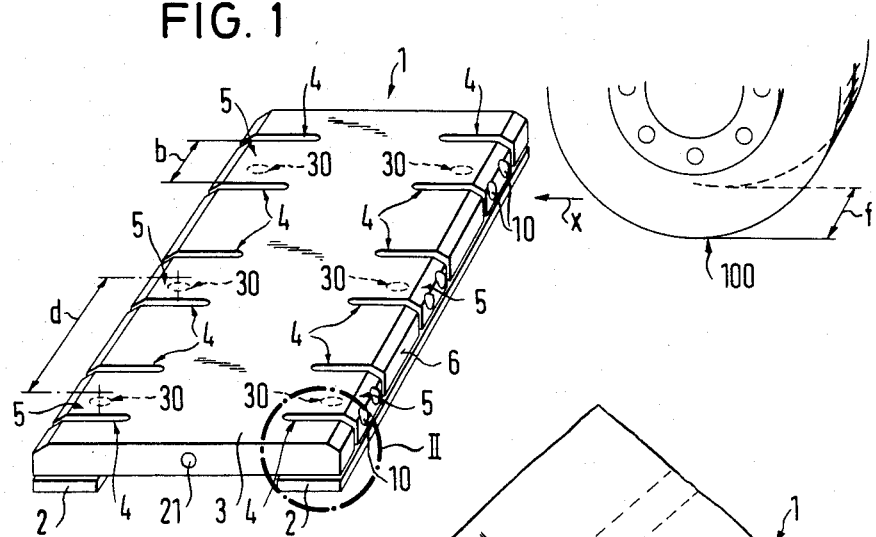
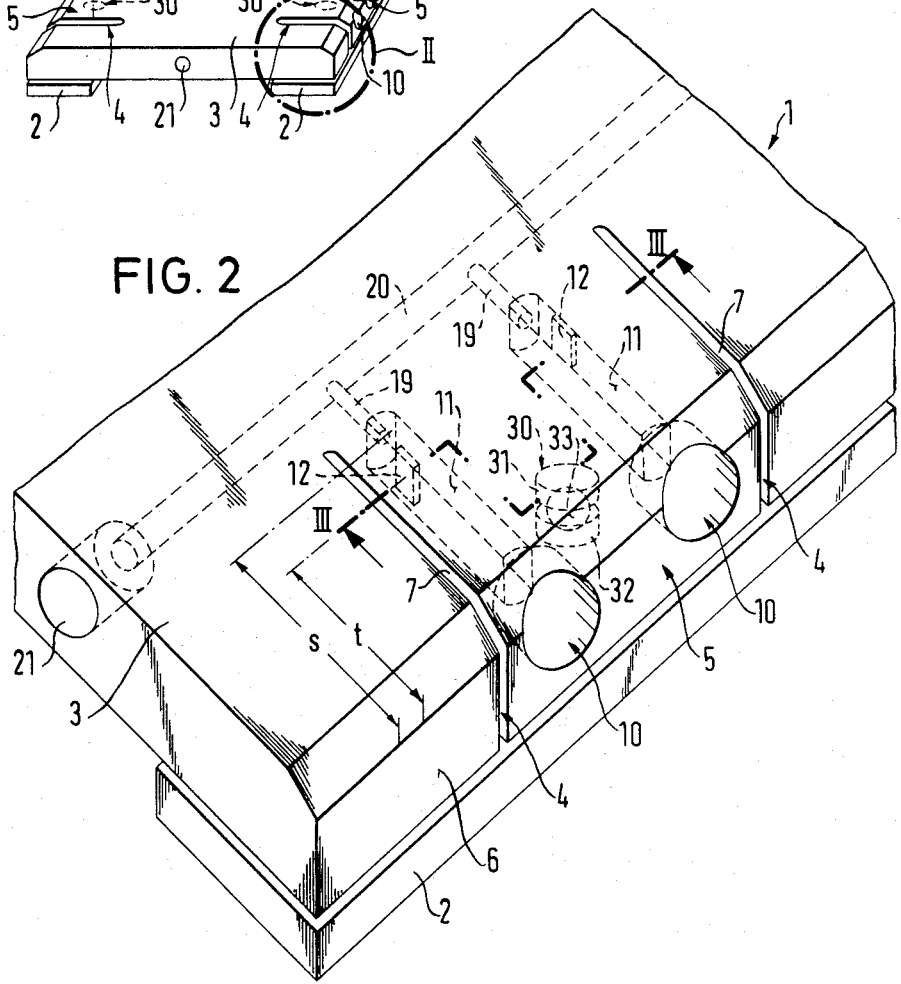

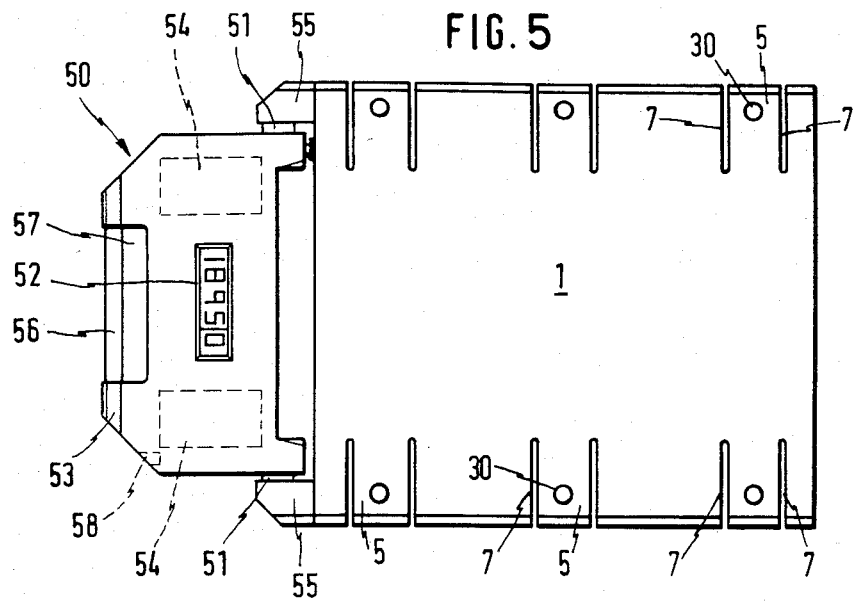
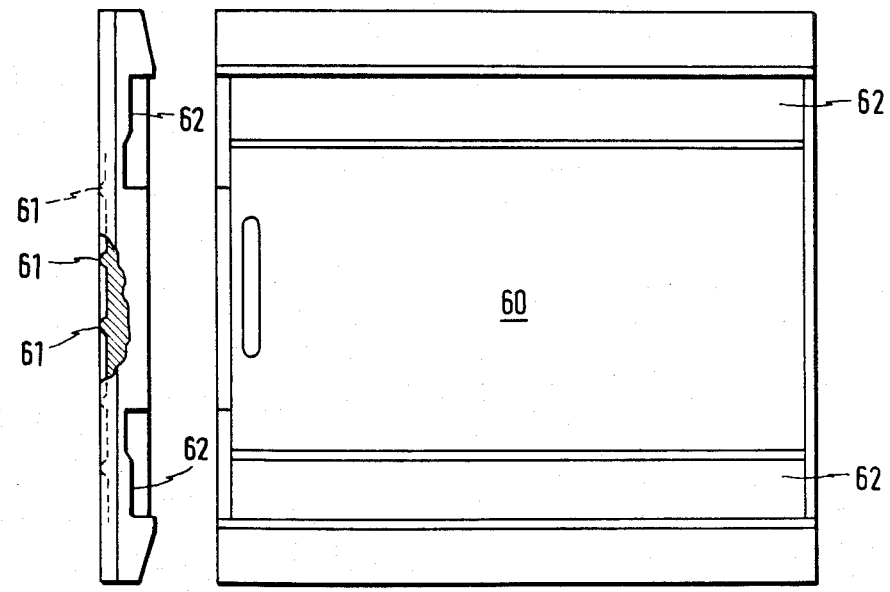
FIG. 5
FIG. 6
FIG. 7

WHEEL LOAD INDICATOR

The invention relates to a wheel load indicator, comprising a flat plate of elastic material having measuring properties, said plate being adapted to be supported at two opposed lateral edges and including recesses disposed in pairs and forming webs between them to which strain gauges are attached for detecting shearing stresses.

In a known wheel load indicator of this kind the webs each are formed between circular enlargements of a pair of recesses, and strain gauges are adhered to the opposed walls of these enlargements, i.e. to the two opposed web walls (CH-A 497 690). The recesses themselves are closed.

In another known wheel load indicator the recesses forming a web between them are of slot-like design starting from the lateral edges of the plate. The strain gauges are adhered to the webs in the plane of the upper surface of the plate (EP-A 1-0034656). With such an arrangement nothing but bending stresses of a plate loaded by a wheel can be determined.

It is an object of the invention to provide a portable wheel load indicator of simple structure which is easy to manufacture and yet assures high measuring accuracy.

To meet this object with a wheel load indicator of the kind specified initially it is provided, in accordance with the invention, that two closed cavities are arranged spaced from each other in each web and have walls extending in the cross sectional direction of the plate, the strain gauges being attached to said walls to measure the sheer stresses within the webs.

Upon introducing and adhering the strain gauges to the walls of the cavities the latter can be closed hermetically in simple manner by using sealing plugs or the like. Thus the measuring elements and their places of attachment as well as their electrical terminals are housed in surroundings protected from any harmful outside influences.

In a simple embodiment of the invention the cavities are formed by closed bores.

Preferably, the recesses as well as the bores start from a lateral edge of the plate and extend transversely thereof.

The strain gauges are conveniently adhered to parallel, planar wall portions of the bore walls each located adjacent the neighboring recesses, at uniform spacings from the lateral edge of the plate. Thus each bore contains only one strain gauge. In further modification of the invention the plate is propped on the ground by having each web rest on a base member by way of a support, while the remaining plate areas are unsupported. Thus the plate is supported along its two opposed lateral edges exclusively by the webs serving as "claws" and their supports.

These supports preferably are arranged between the two bores of each web and designed as point supports supporting the corresponding web on one each of two base members extending below the lateral edges.

The places of attachment of the strain gauges, as seen in the direction of the web width, preferably should be so selected that they coincide with the places of the least shearing deformation due to transverse bending of the webs. In practice it proved to be favorable to select the dimensions such that the ratio between the depth of the recesses and the depth of the place of attachment of the strain gauges in the bores, as measured from the lateral edge of the plate, is approximately 3:2. The ratio between the web width and the spacing of the place of attachment of the strain gauges from the closest recess, as measured along the lateral edge, may be approximately 10:1.

It is furthermore advantageous to have at least two, preferably three webs disposed along two opposed lateral edges of the plate at a center spacing of adjacent webs of no less than twice the web width and no more than the width of a conventional truck twin wheel.

The plate according to the invention preferably is made of an elastic material having measuring properties. Rolled sheet metal of the aluminum alloy AlZnMgCu 0.5 has proved to be especially well-suited as the starting material for making the plate.

The invention provides a flat wheel load indicator of low weight which is easy to transport and of high accuracy in the class of gross scales, the manufacturing expenses being limited. It is a special advantage of the wheel load indicator according to the invention that it yields very accurate measuring results, regardless of the direction of movement onto the scale. In other words, the wheel load indicator may be traversed in a direction transversely of the lateral edges, i.e. in longitudinal direction of the webs as well as in the longitudinal direction of the lateral edges or in inclined direction with respect to the same. In any case the measuring results are no different. For practical reasons of stability of the scale on the ground, it is preferred that it be entered in longitudinal direction of the webs, i.e. transversely of the lateral edges.

As the wheel or axle load is detected in accordance with the invention by the shearing stresses produced in the webs, the result of the measurement is not influenced by the position of the load on the plate. Furthermore, detecting the shearing stress of the plate in the area of the webs permits a wide central zone dimensioned exclusively under aspects of strength. The individual webs always transmit a sum of defined shearing forces, irrespective of the position of the load on the plate.

The invention will be described further, by way of example, with reference to the accompanying drawings, in which:

FIG. 1 is a perspective view of a wheel load indicator according to the invention;

FIG. 2 is a perspective view of part of the wheel load indicator, indicated II, in FIG. 1;

FIG. 5 is a top view of the load indicator with a handle;

FIG. 6 is a side view of floor pan for the indicator;

FIG. 7 is a top view of the floor pan.

Figure 3:
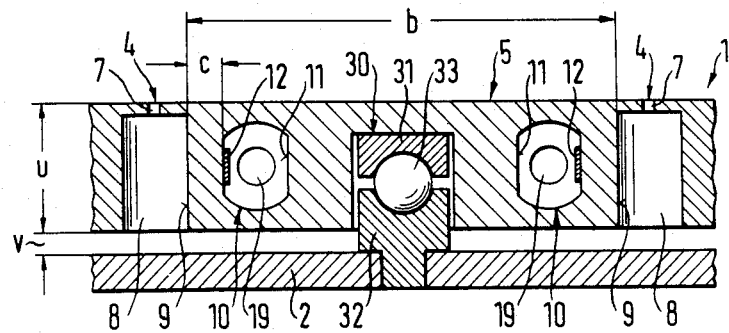
FIG. 3 is a sectional elevation along lines III—III of FIG. 2.
Figure 4:
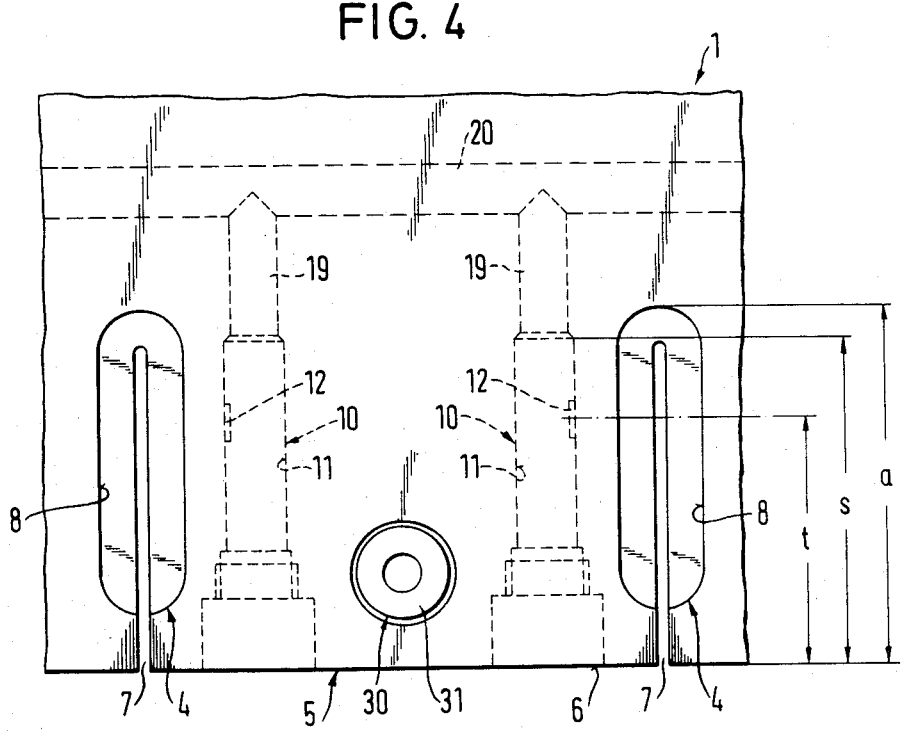
FIG. 4 is a partial view from below of the part of the wheel load indicator shown in FIG. 2.

The wheel load indicator shown in FIGS. 1 to 4 comprises a plate generally indicated by reference numeral 1 and comprising two marginal portions which extend transversely of the running direction x of a wheel to be checked and are supported on foot bars 2, as well as a bending portion 3 between the marginal portions. A series of recesses 4 are provided in the marginal portions, each starting from the lateral edges 6 of the plate 1 and extending to a depth a and pairs of them forming webs 5 which extend in the direction of movement x. These webs 5 support the plate 1 on the foot bars 2.

The design of the recesses 4 is specifically shown in FIG. 3. Each recess 4 passes through the corresponding lateral edge 6 of the wheel load indicator and has a narrow slit portion 7 which is open toward the upper side and to the lateral edge of the plate as well as a downwardly and inwardly contiguous, wide slit portion 8. The narrow slit portion 7 prevents the recess 4 from becoming blocked by greater lumps of dirt, stones, or other foreign matter. The sides 9 facing each other of the slit portion 8 constitute the web walls of the respective web 5.

Each web 5 contains two bores 10 of a length s likewise starting from the respective lateral edge 6 of the plate 1 and extending parallel to the recesses 4. These bores 10 have opposed planar walls 11 which extend in the cross sectional direction, i.e. in the direction of the thickness of the plate 1. At depth t of the bore a strain gauge 12 is adhesively bonded to a wall portion of the planar wall 11 of a bore 10 closest to the adjacent recesses 4. This results in the configuration illustrated in FIG. 3 and comprising two strain gauges 12 facing each other in each web 5. The ratio between the depth a of the recess 4 and the depth t of the places of attachment of the strain gauges 12, as measured from the lateral edge 6, in practice is preferably approximately 3:2, whereas the ratio between the web width b and the spacing c of a strain gauge 12 from the side wall 9 of the adjacent recess 4 is approximately 10:1.

A point support 30 comprising a bearing support 31 fixed to the web and a bearing support 32 fixed to the foot bar 2 as well as a ball 33 between them is arranged between the two bores 10 of each web 5. The entire plate 1 is supported on the foot bars 2 exclusively by such supports 30 individually associated with each web 5. The center spacing d of two adjacent webs 5 along a lateral edge 6 preferably is no greater than twice the web width 2b and no less than the width f of a truck twin wheel designated by reference numeral 100 in FIG. 1. The preferred embodiment as shown in FIGS. 1 to 3 comprises a total of three webs 5 along each lateral edge 6 of the plate 1.

Extensions of the bores 10 in the form of bore portions 19 of smaller diameter are formed inwardly where they intersect a transverse bore 20 equipped at 21 with a tightly sealed feed-through for cables (not shown specifically). This arrangement serves for the electrical connection or transmission of the measuring signals of the strain gauges 12 in all of the webs 5 of the plate 1. Plugs are provided for closely sealing the bores 10 in the lateral edges 6, but they are not shown.

The dimension "b-2c" determines the spacing of the strain gauges 12 as measured in the direction along the lateral edge 6, thereby determining the spacing of the bores 10. The inventors have found that this spacing advantageously should be so selected that the strain gauges come to lie at places of the least shearing deformation under the transverse bending of the webs 5, i.e. of the bending in the direction of the width of the webs. This requirement is met by the dimensions below given a specific embodiment of the plate 1:

a = 60 mm
b = 60 mm
c = 6,5 mm
t = 41 mm
s = 55 mm
u = 20,5 mm
v = 4 mm wherein u = the thickness of the plate and v = the spacing of the underside of the plate 1 from the foot bar 2.

In general the places of attachment of the strain gauges 12 should be selected approximately according to the following relationships: b:c = 10:1 and a:t = 3:2.

When submitted to testing such a structure yielded excellent results, and the measuring accuracy was not influenced by the manner in which a vehicle moved on to the plate 1, whether it was in the direction x, as shown in FIG. 1, or normally or inclined with respect to this direction.

The measuring accuracy was in the order of 0.5% of the final value in detecting the wheel load. This permits classification of the wheel load indicator in the class of coarse indicators or gross scales.

It is an important feature that the strain gauges 12, rather than being adhered to the walls of the weakening recesses or the walls of the web 5, are adhesively bonded to the walls of bores 10 provided in the web 5, which walls extend in the direction of the thickness of the plate. Thus the strain gauges detect very exactly the shearing stresses occurring in the web 5, irrespective of the direction of movement onto the plate and the position of the wheel to be measured on the plate 1. Furthermore, optimum protection from mechanical or chemical attack is assured for the strain gauges and their electrical supply.

Plate segments comprising, for instance, two webs 5 which are aligned with respect to each other in x-direction and comprising a corresponding number of recesses defining these webs can be manufactured in the manner shown. Their load carrying capacity can be increased by interconnecting them in module fashion, e.g. by means of angle irons. The spacing between recesses 4 in x-direction always should be so great that it will cause no problem to fit the longitudinal tire contact area of the wheel of a commercial vehicle on the bending portion 3 in between which has no recesses.

A wheel load indicator of the design described above and having the typical dimensions of 700 mm in lengthwise direction and 400 mm in x-direction which is perpendicular to the lengthwise direction has a weight in the order of 20 kg and is easily portable by handles mounted on the same. This is an essential advantage if the wheel load indicator is used by public authorities or private enterprises.

FIG. 5 shows a wheel load indicator of the type illustrated in FIGS. 1 to 4. Additionally, a handle 50 is shown which is mounted to the head portion of the plate 1 by means of two pins 51 fitting in projections 55 that constitute extensions of the side edges of the plate. The handle 50 mounts therein a digital display panel 52 at the same level as the wheel supporting surface of the plate 1 and storage batteries 54, which may be charged via a lateral charging connection that is not disposed in the wheel supporting surface. The charging connection is in alignment with a gripping bar 56 behind which a through-opening 57 for gripping purposes is provided. A closing switch 58 is also mounted on the side so as to prevent the switch from being overrun.

The FIGS. 6 and 7 illustrate a floor pan 60 which is placed beneath the plate 1 when measurements are carried out on unfortified terrain, on crushed rock or the like. The floor pan 60, which is made of metal, is placed with its ridges 61 onto the unfortified terrain and carries the bottom strips 6 provided on the underside of the plate 1 (see FIG. 1) by means of parallel lateral supporting surfaces 62.

What is claimed is:

1. A wheel load indicator, comprising a flat plate of elastic material having measuring properties, said plate being adapted to be supported at two opposed lateral edges and including recesses (4) disposed in pairs and forming webs (5) between them to which strain gauges (12) are attached for detecting shearing stresses, characterized in that two spaced apart, closed cavities (10) are disposed in each web (5) extending in a direction substantially parallel to the upper surface of the plate (1), the strain gauges (12) being carried by the cavity (10) defining walls.

2. The load wheel indicator as claimed in claim 1, characterized in that the cavities (10) are formed by closed bores.

3. The wheel load indicator as claimed in claim 2, characterized in that the recesses (4) just like the bores (10) start from a lateral edge (6) of the plate (1) and extend transversely of the same.

4. The wheel load indicator as claimed in claim 3, characterized in that the strain gauges (12) are adhesively bonded at a spacing (t) from the lateral edge (6) of the plate to parallel planar wall portions (11) of the bore walls each located adjacent the neighboring recesses (4).

5. The wheel load indicator as claimed in claim 1, characterized in that for propping the plate (1) on the ground each web (5) rests on a base member (2) by way of a support (30), and in that the other areas of the plate are unsupported.

6. The wheel load indicator as claimed in claim 3, characterized in that a point support (30) is disposed between the two bores (10) of each web (5) and supports the corresponding web (5) on one each of two base members (2) extending under the lateral edges.

7. The wheel load indicator as claimed in claim 3, characterized in that the bores (10) have portions (19) which extend inwardly beyond the recesses (4) and are connected by a transverse bore (20) for the wiring of all strain gauges (12), and in that the outlets of the bores (10), with the exception of the transverse bore (20) equipped with a sealed feedthrough for the electric connection, are sealed hermetically.

8. The wheel load indicator as claimed in claim 1, characterized in that at least two, preferably three webs (5) are disposed along two opposed lateral edges (6) of the plate (1) at a center spacing (d) of adjacent webs of no less than twice the web width (b) and no more than the width (f) of a conventional truck twin wheel (100).

9. The wheel load indicator as claimed in claim 3, characterized in that the ratio between the depth (a) of the recesses (4) and the depth (t) of the place of attachment of the strain gauges (12) in the bores (10), as measured from the lateral edge (6) of the plate (1), is approximately 3:2.

10. The wheel load indicator as claimed in claim 1, characterized in that the places of attachment of the strain gauges (12), as seen in the direction of the width of the webs (5), coincide with the places of the least shearing deformation due to transverse bending of the webs (5).

11. The wheel load indicator as claimed in claim 10, characterized in that the ratio between the web width (b) and the spacing (c) of the place of attachment of the strain gauges (12) from the closest recess (4), as measured along the lateral edge (6), is approximately 10:1.

12. The wheel load indicator as claimed in claim 1, characterized in that the plate (1) is made of a high-strength light metal alloy, especially of rolled sheet metal of the aluminum alloy AlZnMgCu 0.5.

13. A wheel load indicator as claimed in claim 1, characterized in that a handle (50) is mounted at a front edge of the plate (1) and a display panel (52) is contained in the handle.

14. A wheel load indicator as claimed in claim 13, characterized in that the indicator including the display panel (52) is supplied with electrical power from a storage battery (54) accomodated in the handle.

15. A wheel load indicator as claimed in claim 14, characterized in that the storage battery (54) may be charged through a charging connector (53) provided on the side of the handle (50), i.e. outside of the wheel supporting surface of the plate (1).

16. A wheel load indicator as claimed in claim 1, characterized in that a floor pan (60) is provided for placement beneath the plate (1) on unfortified terrain, crushed rock or the like.

17. A combination of one to three pairs of wheel load indicators as claimed in claim 1, the wheel load indicators being electrically interconnected to form an axle load indicator.

18. The wheel load indicator as claimed in claim 3, characterized in that the plate (1) is made of a high-strength light metal alloy, especially of rolled sheet metal of the aluminum alloy AlZnMgCu 0.5.

19. In a flat plate wheel load indicator adapted for support at its lateral edges and having plate with its lateral edges slotted to form a plurality of laterally extending webs to which strain gauges are attached, the improvement wherein said strain gauges are located internally of cavities extending into said webs from said lateral edges.

20. The wheel load indicator of claim 19 including two cavities within each of said plurality of webs.

21. The wheel load indicator of claim 19 wherein each of said cavities contains only one strain gauge.

22. The wheel load indicator of claim 19 wherein said strain gauges are carried by the cavity defining walls of said webs in the area of least shearing deformation due to transverse bending of said webs.

23. The wheel load indicator of claim 22 wherein the ratio of the distance from the lateral edge of the web to said strain gauges and to the closed end of said cavity is approximately 2:3.

24. The wheel load indicator of claim 22 wherein the ratio of web width to the distance between the strain gauge and the near side of the web is approximately 10:1.

25. The wheel load indicator of claim 22 wherein the distance between the center line of adjacent webs is not greater than about twice the width of said web and is not greater than the width of the tire of the vehicle to be weighed.

* * * * *